(12) United States Patent
Marshall et al.

(10) Patent No.: US 6,503,073 B2
(45) Date of Patent: Jan. 7, 2003

(54) SYSTEM FOR FORMING A THERMOSET GOLF BALL COVER

(75) Inventors: Gary G. Marshall, Soddy Daisy, TN (US); Pijush K. Dewanjee, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/683,280

(22) Filed: Dec. 7, 2001

(65) Prior Publication Data

US 2002/0039602 A1 Apr. 4, 2002

Related U.S. Application Data

(62) Division of application No. 09/496,126, filed on Feb. 1, 2000, now Pat. No. 6,395,218.

(51) Int. Cl.[7] .......................... B29C 43/04; B29C 43/18; B29C 43/34; B29C 43/50
(52) U.S. Cl. .................... 425/116; 425/125; 425/126.1; 425/256; 425/261; 425/441
(58) Field of Search .............................. 425/116, 126.1, 425/256, 261, 441, 125

(56) References Cited

U.S. PATENT DOCUMENTS

| | | | |
|---|---|---|---|
| 721,462 A | 2/1903 | Richards ...................... 264/275 |
| 2,117,400 A | * 5/1938 | Cobb | |
| 2,940,128 A | 6/1960 | Howerman et al. | |
| 3,034,791 A | 5/1962 | Gallagher | |
| 3,068,522 A | 12/1962 | Nickerson et al. | |
| 3,112,521 A | 12/1963 | Ward | |
| 3,130,102 A | 4/1964 | Watson et al. | |
| 3,147,324 A | 9/1964 | Ward | |
| 3,177,280 A | 4/1965 | Ford et al. | |
| 3,616,101 A | 10/1971 | Satchell et al. | |
| 3,979,126 A | 9/1976 | Dusbiber | |
| 3,989,568 A | 11/1976 | Isaac | |
| 4,123,061 A | 10/1978 | Dusbiber | |
| 4,203,941 A | 5/1980 | Brooker ....................... 264/250 |
| 4,959,000 A | 9/1990 | Giza ........................... 425/116 |
| 5,006,288 A | 4/1991 | Rhodes, Jr. et al. ........ 264/46.6 |
| 5,006,297 A | 4/1991 | Brown et al. ................ 264/275 |
| 5,112,556 A | 5/1992 | Miller ......................... 264/279 |
| 5,194,191 A | 3/1993 | Nomura et al. .............. 264/234 |
| 5,334,673 A | 8/1994 | Wu | |
| 5,484,870 A | 1/1996 | Wu | |
| 5,692,974 A | 12/1997 | Wu et al. ..................... 473/377 |
| 5,703,193 A | 12/1997 | Rosenberg et al. | |
| 5,733,428 A | 3/1998 | Calabria et al. .......... 264/271.1 |
| 5,885,172 A | 3/1999 | Herbert et al. ............... 473/354 |
| 5,888,437 A | 3/1999 | Calabria et al. .......... 425/126.1 |
| 5,897,884 A | 4/1999 | Calabria et al. ............. 425/116 |
| 5,908,358 A | 6/1999 | Wu ............................. 473/378 |
| 5,947,843 A | 9/1999 | Calabria et al. ............. 473/377 |
| 6,328,921 B1 | * 12/2001 | Marshall et al. ............. 425/116 |
| 6,409,492 B1 | * 6/2002 | Marshall ...................... 425/116 |

FOREIGN PATENT DOCUMENTS

WO WO 99/43394 2/1999

\* cited by examiner

*Primary Examiner*—Robert Davis
(74) *Attorney, Agent, or Firm*—Michael A. Catania

(57) ABSTRACT

A method and system for casting a thermoset layer over a golf ball precursor product is disclosed herein. The system includes multiple stations connected by a conveyor system. The thermoset flowable material is dispensed into a plurality of cavities on each of the mold halves. A plurality of golf ball precursor products are then centered and inserted into the first mold half cavities. The mold halves are mated, heated and cooled. Then, at a de-molding station, the mold halves are separated and the thermoset layered golf balls are removed from the second mold half. A preferred thermoset material is a thermoset polyurethane.

8 Claims, 13 Drawing Sheets

SYSTEM FOR FORMING A THERMOSET GOLF BALL COVER

CROSS REFERENCES TO RELATED APPLICATIONS

This application is a divisional application of U.S. application Ser. No. 09/496,126 filed on Feb. 1, 2000, now U.S. Pat. No. 6,395,218.

FEDERAL RESEARCH STATEMENT

[Not Applicable]

BACKGROUND OF INVENTION

1. Field of the Invention

The present invention relates to an apparatus and method for forming a golf ball cover layer. More specifically, the present invention relates to an apparatus and method for forming a thermoset polyurethane cover on a golf ball core.

2. Description of the Related Art

Golf balls may comprise one-piece constructions or they may include several layers including a core, one or more intermediate layers and an outer cover that surrounds any intermediate layer and the core. In multi-component golf balls, there exists an inner core. Often, this core is made by winding a band of elastomeric material about a spherical elastomeric or liquid-filled center. Alternatively, the core may be a unitary spherical core made of a suitable solid elastomeric material. One such material that is conventionally used for the core of golf balls is a base rubber, such as polybutadiene, which is cross-linked with a metal acrylate, such as zinc diacrylate.

In the construction of some multi-component golf balls, an intermediate boundary layer is provided outside and surrounding the core. This intermediate boundary layer is thus disposed between the core and the outer cover of the golf ball.

Located outwardly of the core and any intermediate boundary layer is a cover. The cover is typically made from any number of thermoplastic or thermosetting materials, including thermoplastic resins such as ionomeric, polyester, polyetherester or polyetheramide resins; thermoplastic or thermoset polyurethanes; natural or synthetic rubbers such as balata (natural or synthetic) or polybutadiene; or some combination of the above.

Golf balls are typically manufactured by various molding processes, whether one-component or multicomponent balls. Generally, the core of the golf ball is formed by casting, compression molding, injection molding or the like. If an intermediate boundary layer is desired, one or more intermediate boundary layers are added over the core by any number of molding operations, including casting, compression molding, and/or injection molding. The cover is then formed over the core and intermediate boundary layers, if present, through casting, compression molding, and/or injection molding.

One example of a conventional golf ball manufacturing process is described in U.S. Pat. No. 3,068,522, issued on Dec. 18, 1962 (the '522 patent). The manufacturing process disclosed in the '522 patent uses a molding press having upper and lower die portions that surround a golf ball core. A retractable seat contacts the golf ball core to place the same in the desired orientation within the die cavity. The cover material is then injected into the die cavity to form the cover of the ball. The '522 patent further discloses that the timing of the retraction of the retractable seat is critical and depends, in part, on the flow rate of the cover material into the mold cavity. In order to prevent the retardation of the flow rate or pre-hardening of the injected coating material, the '522 patent teaches that in some instances, it may be necessary to heat the molding dies and pre-heat the golf ball core to a temperature slightly above ambient temperature.

Another example. U.S. Pat. No. 5,194,191 (the '191 patent), issued Mar. 16, 1993 discloses a method of preparing thread-wound golf balls. In the '191 patent, a rubber thread or material is wound around a frozen core of material to form a core. Immediately thereafter, the core undergoes microwave heating to rapidly thaw the frozen core without heating the rubber thread layer and without moisture condensation taking place on the surface of the core. The method of the '191 patent allegedly reduces the core thawing time and eliminates the need for a drying step.

These and other current golf ball manufacturing processes continue to suffer from a number of disadvantages. For example, when the outer cover of the golf ball is made from a thermoset material, e.g., thermoset polyurethane, the core and any intermediate boundary layer(s) tend to undergo thermal expansion during the casting of the outer cover, as heat is generated by the exothermic reaction of the thermoset processes used in the formation of the cover. As the cover forms, and before the cover develops sufficient green strength, the thermal expansion of the core and any intermediate boundary layer, in turn, may cause the outer cover of the golf ball to fracture or crack. Although this problem is particularly relevant to covers that are formed of thermoset polyurethane, it is not believed to be limited thereto. Similar problems may arise with other materials and processes.

Cracking is not the only problem with the current conventional methods of manufacturing golf balls. Since a temperature gradient exists between the core, intermediate layer, if any, and the outer cover, the central portion of the ball acts as a heat sink that absorbs heat given off during the cover-making process. In this regard, the reaction that takes place to cure the outer cover takes longer given the cooler temperature in the inner core of the ball. Production cycle times are thus adversely increased.

Consequently, there remains a need for methods of manufacturing golf balls that do not suffer from the above disadvantages. Moreover, a system and method that permits precision centering of a core in relation to a cover is greatly desired.

SUMMARY OF INVENTION

The present invention provides a method and system for automatically casting a thermoset layer over a golf ball precursor product, such as a core with a boundary layer. The present invention allows for a plurality of golf ball precursor products to be simultaneously cast molded within a plurality of cavities containing the thermoset material. A preferred thermoset material is a thermoset polyurethane material.

One aspect of the present invention is a method for casting a thermoset layer on each of a plurality of golf ball precursor products. The method includes dispensing a flowable material from a stationary dispenser into each of a plurality of cavities disposed on a first mold half and a second mold half. The flowable material is a thermoset polymer material, precursor thermoset polymer materials, or a mixture thereof. Next, each of the plurality of golf ball precursor products is inserted into a corresponding cavity of the plurality of cavities of the first mold half.

Next, the first mold half is inverted and mated with the second mold half to form a mold assembly to enclose each of the plurality of golf ball precursor products within a spherical cavity to form a thermoset layer on each of the plurality of golf ball precursor products. Next, the mold assembly is heated to cure the thermoset layer on each of the golf ball precursor products. After curing, the mold assembly is separated into the first mold half and the second mold half to expose each the plurality of golf ball precursor products with a thermoset layer thereon for removal from the second mold half.

Another aspect of the present invention is a system for casting a thermoset layer on a golf ball precursor product. The system includes a mold assembly having first and second mold halves with each having a plurality of hemispherical cavities therein. The system also includes a dispensing mechanism having a stationary dispenser and an X-Y gantry. The stationary dispenser dispenses a flowable material into each of the plurality of cavities while the X-Y gantry moves each of the mold halves in a figure eight pattern below it. The system also includes an insertion mechanism having a plurality of vacuum cups for suctioning a plurality of golf ball precursor products from a platen and moving downward along a longitudinal pathway. The insertion mechanism also has a lifter for lifting the first mold half upward along the longitudinal pathway toward the vacuum cups. The system also includes a mold assembly mechanism for inverting the first mold half and mating it with the second mold half. The system also includes a conveyor for transferring the mold assembly along the system, and a heating oven for curing a thermoset layer on each of the golf ball precursor products. Finally, the system includes a de-molding mechanism for separating the first mold half from the second mold half, and removing each of the thermoset layered golf balls from the first mold half.

Having briefly described the present invention, the above and further objects, features and advantages thereof will be recognized by those skilled in the pertinent art from the following detailed description of the invention when taken in conjunction with the accompanying drawings.

DETAILED DESCRIPTION

The casting system and method of the present invention is designed to be performed automatically with minimal user contact. In a preferred embodiment, the present invention is utilized to form a thermoset polyurethane cover over a core and boundary layer. The present invention preferably processes ten golf balls simultaneously.

Figure 1:
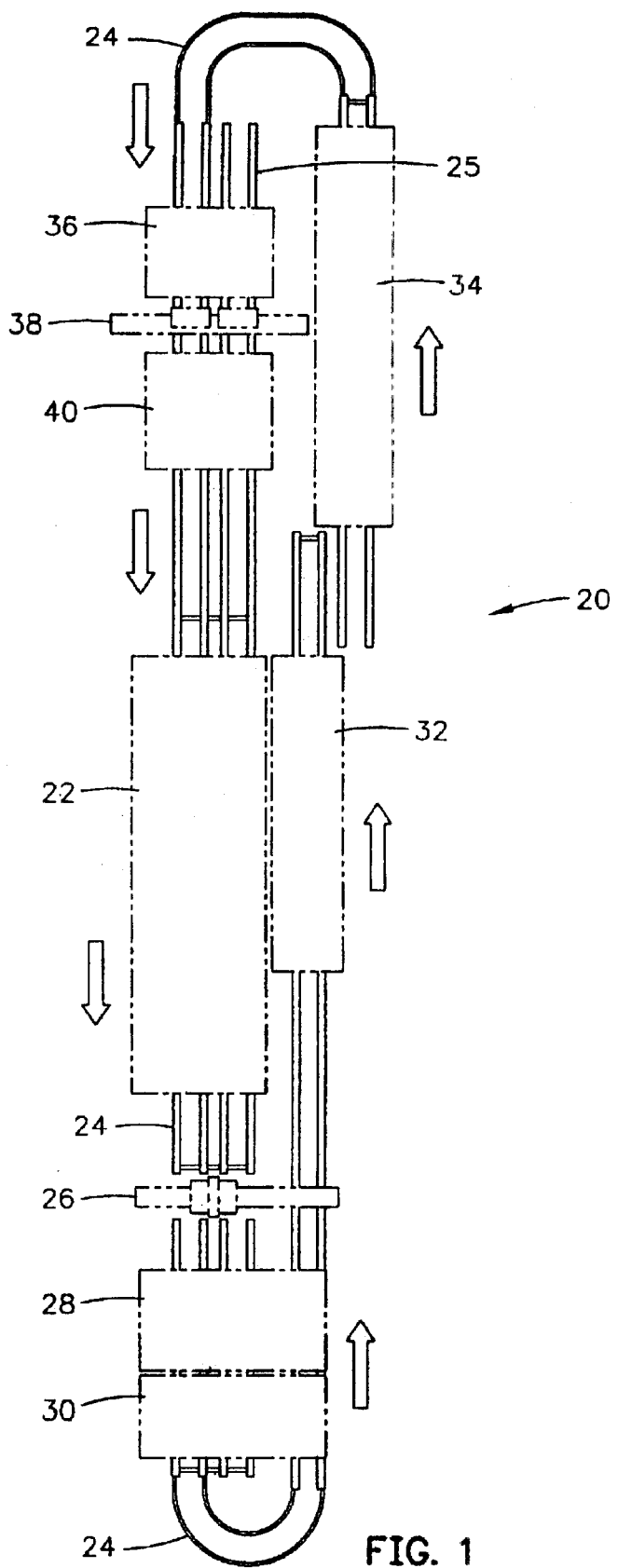
FIG. 1 is a schematic view of a casting system.

A preferred casting system 20 is shown in FIG. 1. The cycle of the system 20 begins with mold halves preheated to a predetermined temperature in a preheating oven 22. The pre-heating prevents the cooling of the flowable thermoset material. From there, the mold halves are transported on conveyors 24 and 25 to a dispensing station 26 where each cavity of each mold half, is filled with the flowable thermoset material, preferably a thermoset polyurethane. The mixture is allowed to gel, or partially cure for about 30 to 90 seconds, then a golf ball precursor product is inserted in each of the mold cavities of one mold half at a core insertion station 28, which will be described below in greater detail. Preferably, the golf ball precursor products are heated to a predetermined temperature prior to insertion, such as described in U.S. Pat. No. 6,200,512, entitled Golf Balls And Methods Of Manufacturing The Same, which is hereby incorporated by reference. During this time, the cavities of a second mold half have received a predetermined quantity of the flowable thermoset material, and the material has been curing or gelling for about 30 to 90 seconds. After about 10 to 30 seconds, the first mold half is transferred to a mold assembly station 30 to be inverted and mated with the second mold half to form a mold assembly with each mold cavity of the first mold half aligning with a corresponding mold cavity of the second mold half. The mold assembly is then transferred on the conveyor 24 to a curing oven 32 where it is subject to temperatures between 140 to 220 degrees Fahrenheit at pressures of ⅓ to 2 tons per cavity for about 2 to 10 minutes. Then, the mold assembly is partially cooled in a cooling oven 34. Next, the mold assembly is transferred to a disassembly station 36 for separating the mold halves. The first mold half is placed on a second conveyor line 25 and the second mold half is placed on the first conveyor line 24. Then, the golf balls are removed from the second mold half at a removal station 38. The mold halves are cleaned and inspected at an inspection station 40, then the process is repeated.

Figure 2:
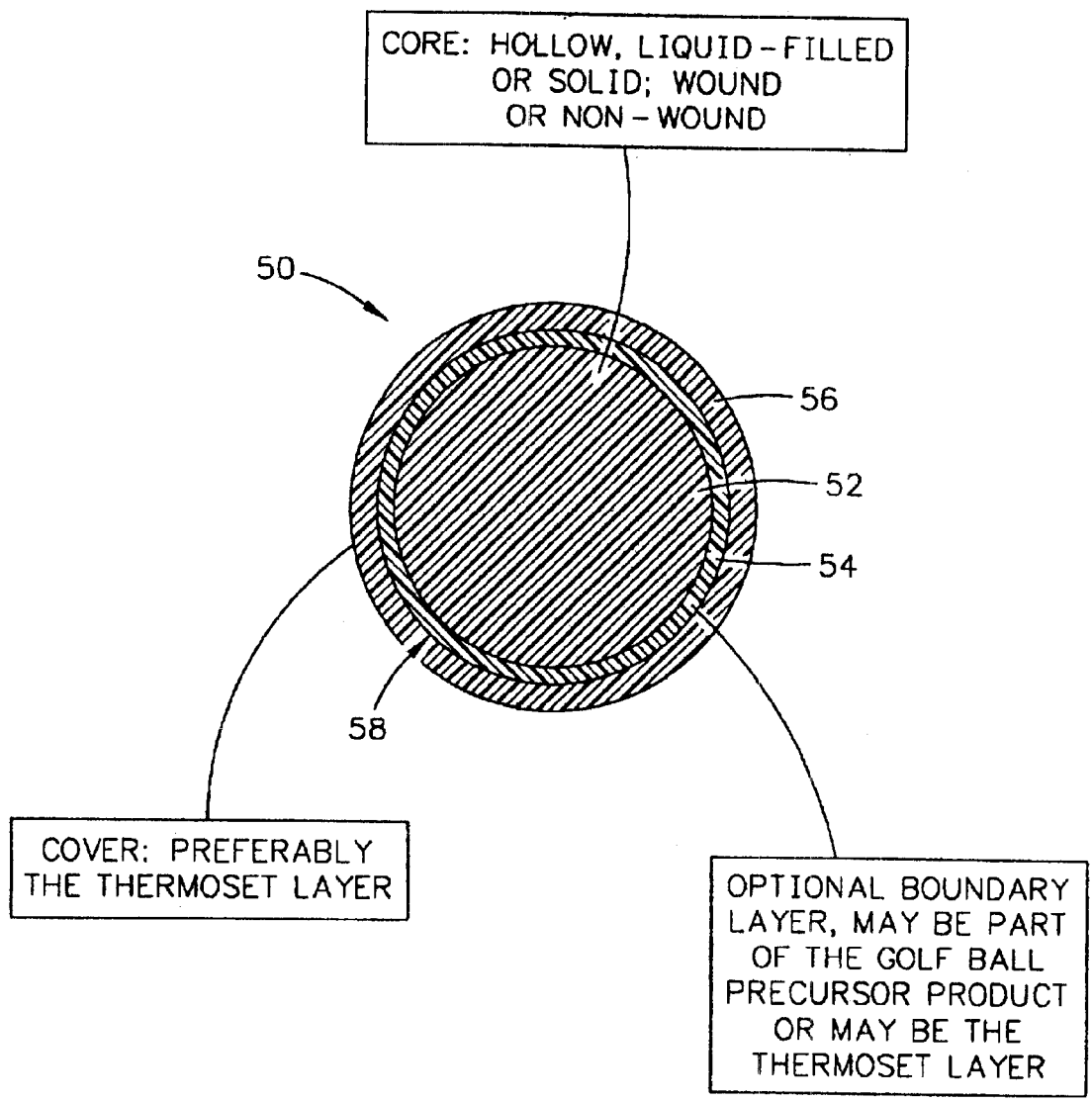
FIG. 2 is a cross-sectional view of a golf ball manufactured using the present invention.
Figure 3:
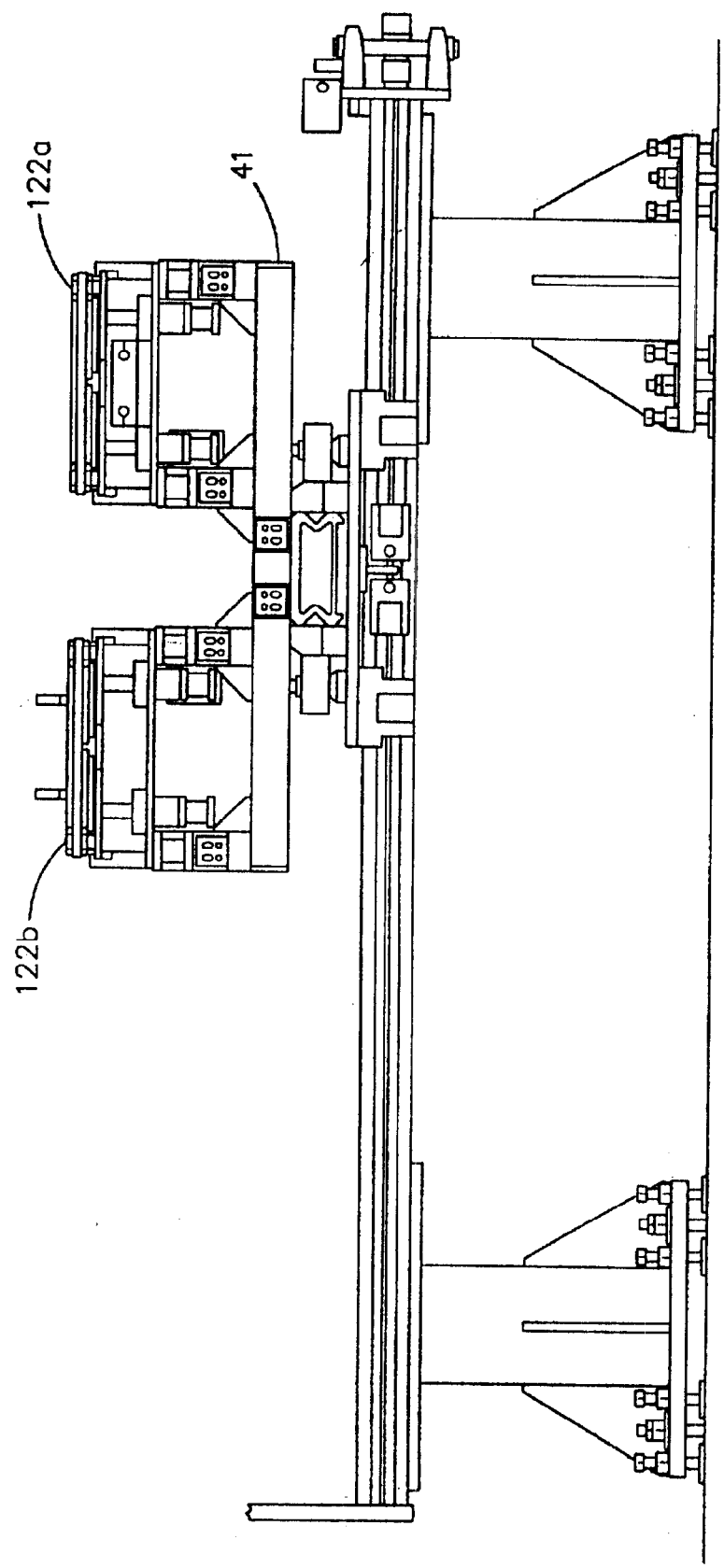
FIG. 3 is a front view of the dispensing station of the present invention.
Figure 4:
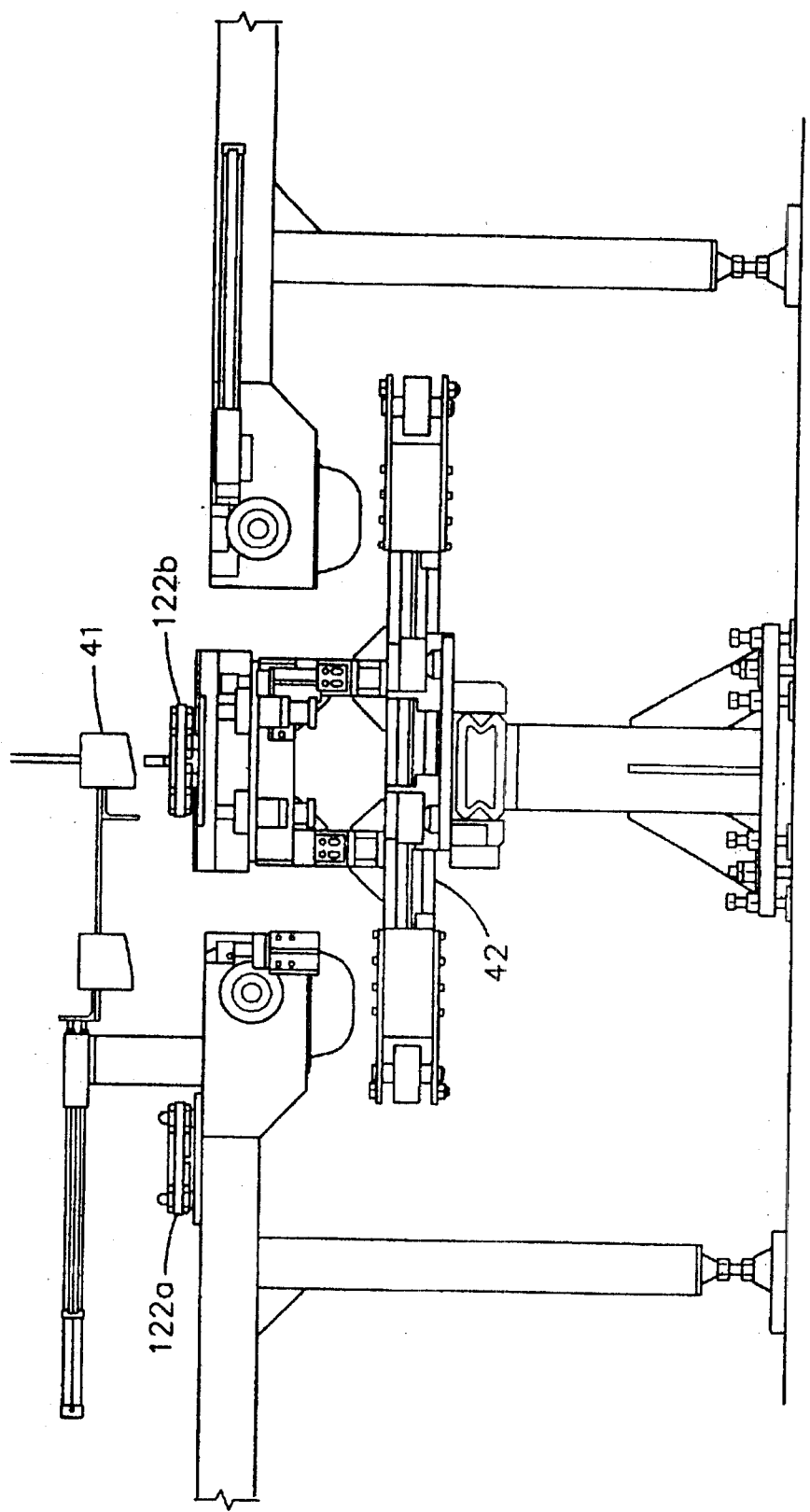
FIG. 4 is a side view of the dispensing station of the present invention.

As shown in FIG. 2, a golf ball 50 has a core 52, an optional boundary layer 54 and a cover 56. The golf ball precursor products 58 may be the core 52 alone (solid, liquid or hollow, and wound or non-wound). However, preferably the golf ball precursor product 58 is the core 52 with one or more intermediate or boundary layers 54 over the core portion. The cover 56 is preferably the thermoset material layer that is casted using the casting process mentioned above. However, the boundary layer 54 may be the thermoset layer, and a cover may be formed over it. A preferred thermoset material is a thermoset polyurethane such as described in U.S. Pat. No. 6,117,024, entitled Polyurethane Cover For A Golf Ball, which pertinent parts are hereby incorporated by reference. However, those skilled in the relevant art will recognize that other thermoset materials may be used with the present invention without departing from the scope and spirit of the present invention.

Figure 5:
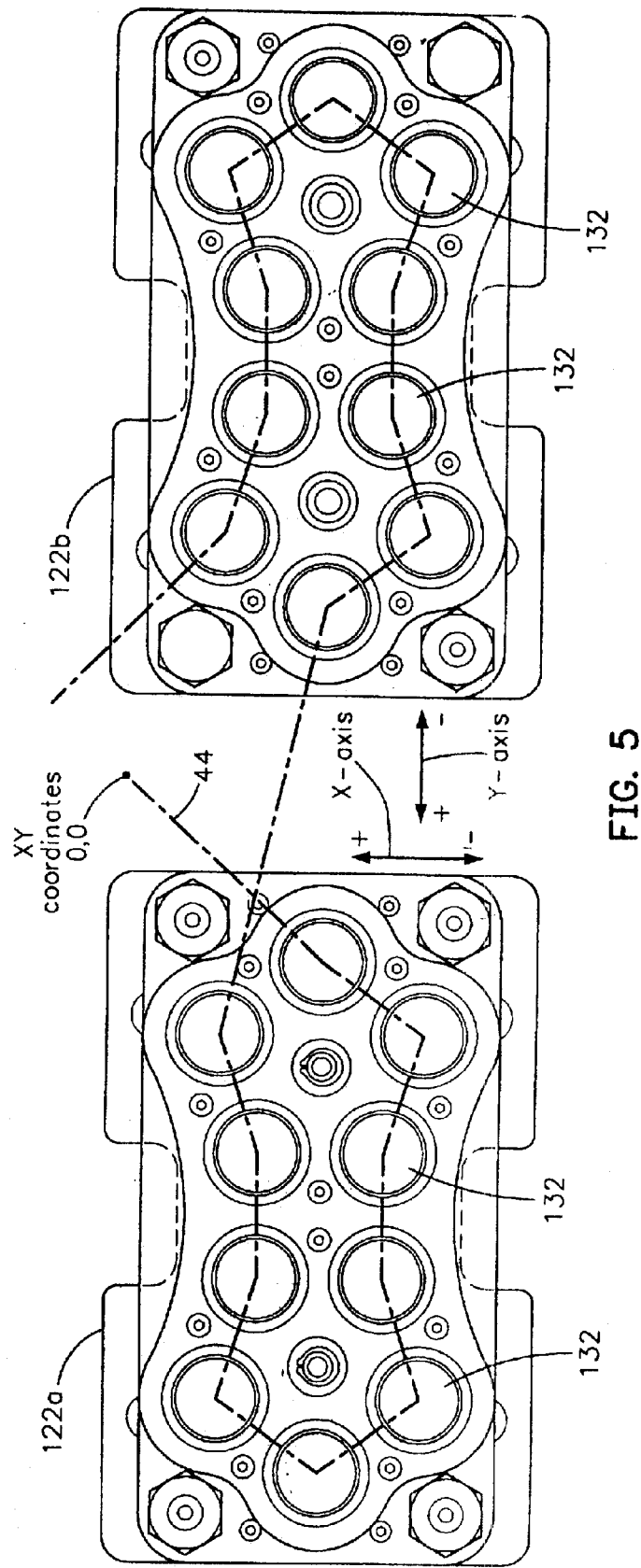
FIG. 5 is an isolated view of the figure eight pattern of dispensing into each of the cavities of the first and second mold halves.
Figure 6:
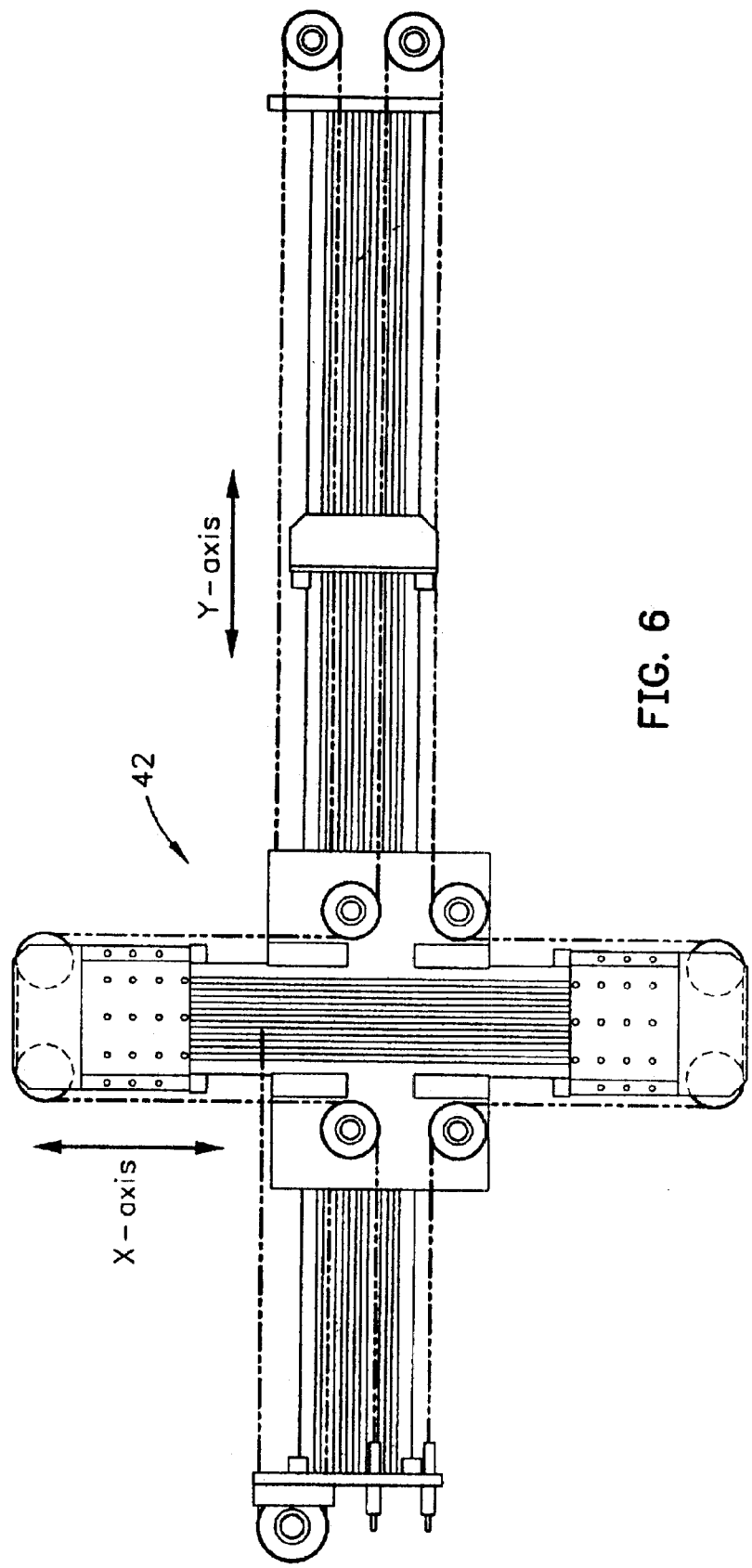
FIG. 6 is an isolated view of the X-Y gantry of the dispensing station.

The dispensing station 26 is illustrated in FIGS. 3–6. The dispensing station 26 has a stationary dispenser 41 for dispensing the flowable material from a mixing chamber to each of the plurality of cavities 132 of each of the mold halves 122a–b. The mold halves 122a–b are conveyed on conveyors 24 and 25 to an X-Y gantry 42. The X-Y gantry 42 moves each of the mold halves 122a–b in a X direction and a Y direction making a figure eight pattern 44, as shown in FIG. 5, to dispense a predetermined quantity of the flowable thermoset material into each of the plurality of cavities 132. In a preferred embodiment, the flowable thermoset material is a thermoset polyurethane that is dispsensed in an uncured flowable form in an amount ranging from 1.0 to 4.0 grams, most preferably in an amount ranging from 2.0 to 3.5 grams, and most preferably 2.5 grams. In operation, the stationary dispenser 41 begins with the first mold half 122a, and delivers a shot of the flowable thermoset material into a cavity 132, then the X-Y gantry 42 moves the mold halves 122a–b to place another cavity 132 under the stationary dispenser 41. The stationary dispenser 41 then delivers another shot of the flowable thermoset material, and the operation is repeated until all of the plurality of cavities 132 have received the flowable thermoset material. The dispensing of the flowable material into each cavity and the movement of the each cavity is preferably accomplished within 1.0 second. The operation is preferably accomplished within 10 to 30 seconds, and most preferably within 22 seconds. After the dispensing station 26, the first mold half 122a is conveyed to the insertion station 28 while the second mold half is conveyed to the mold assembly station 30.

Figure 7:
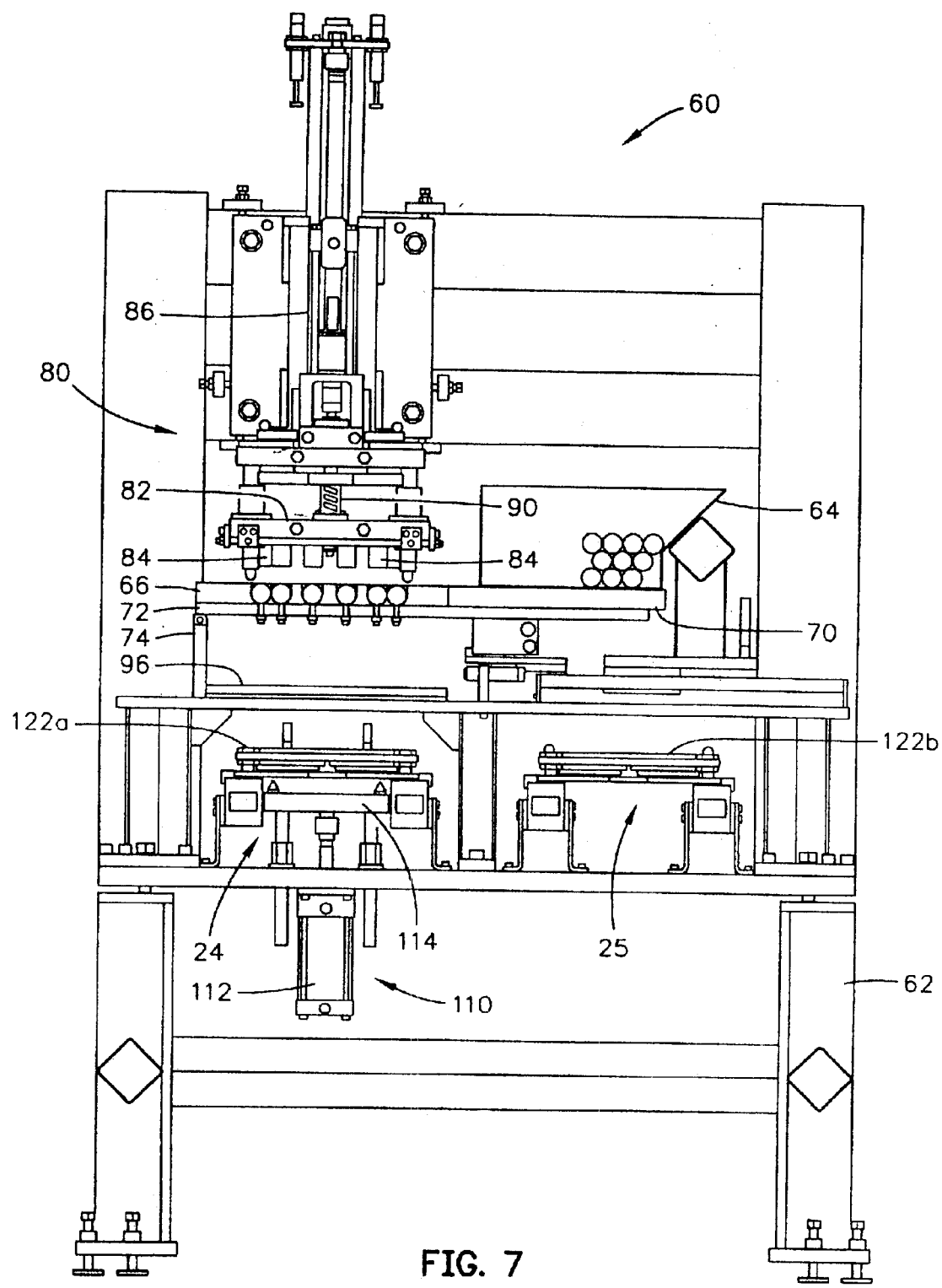
FIG. 7 is a front view of the insertion station of the present invention.
Figure 8:
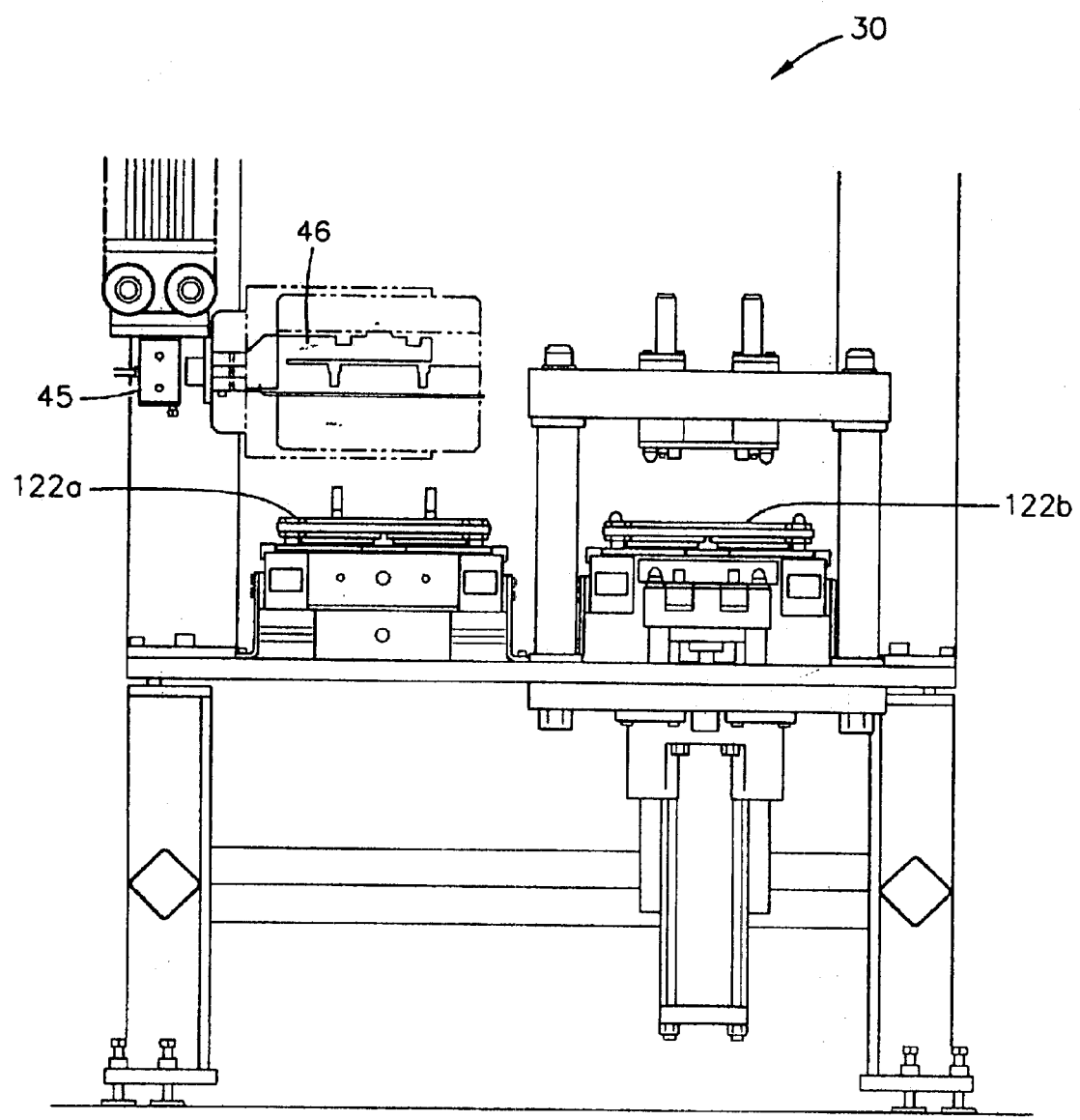
FIG. 8 is a front view of the mold assembly station of the present invention.
Figure 9:
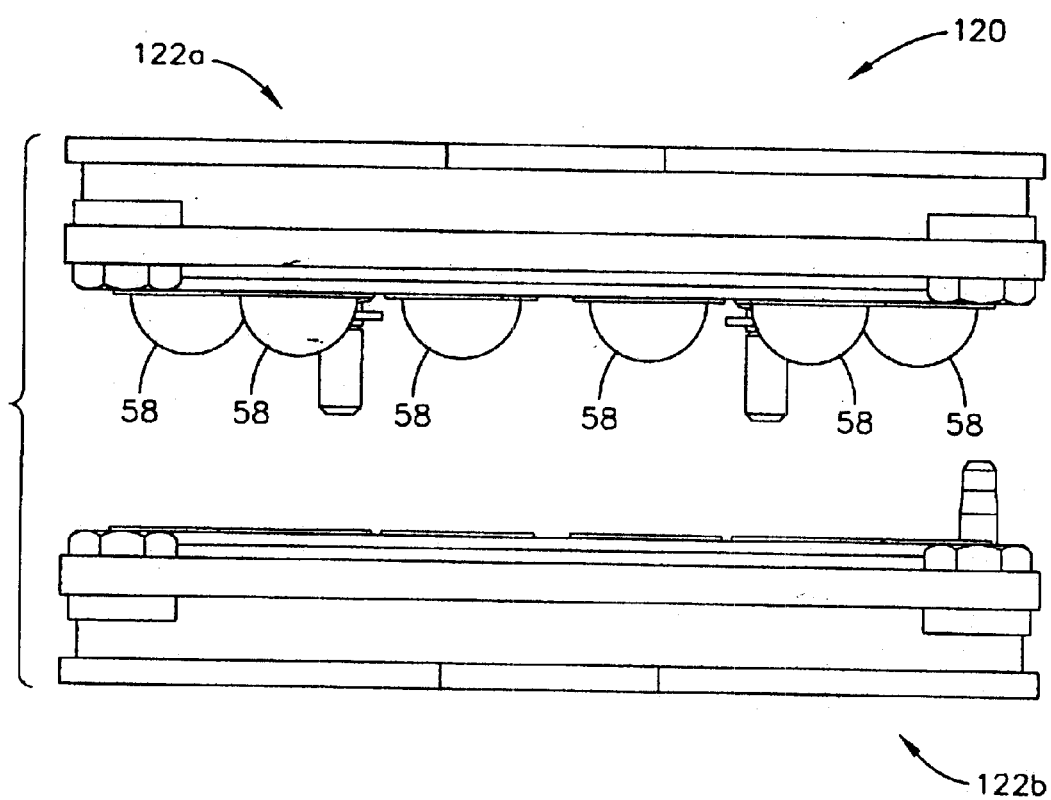
FIG. 9 is a side view of a mold assembly utilized with the present invention.

The insertion station 28 is illustrated in FIG. 7. The insertion station has a system 60 that is mounted on a frame 62. The system 60 includes a source 64 of golf ball precursor products. The source 64 is preferably a hopper that receives golf ball precursor products that have been manufactured outside of the system 60 and heated as discussed above. The source 64 delivers the golf ball precursor products in a predetermined pattern to a platen 66. The platen 66 moves along a horizontal plane from a hopper position 70 to a removal position 72. The removal position 72 is along a longitudinal pathway 74. In this manner, golf ball precursor products are delivered from the source 64 to insertion mechanism 80.

The insertion mechanism 80 is disposed along the longitudinal pathway 74, and is operable along this pathway 74. The insertion mechanism 80 includes a locating plate 82 with a plurality of vacuum cups 84 connected thereto. The locating plate 82 has its movement controlled by a servo motor 86 disposed within the mechanism 80. The servo motor 86 allows the vertical movement of the locating plate 82 to be precisely controlled to effect precision centering of each of the golf ball precursor products 58 within a cavity containing a thermoset material. This precision centering allows for concentricity of the core 52 in relation to the cover 56, and possible boundary layer 54. A conventional computer processing unit (CPU) 88, not shown, is programmed to control the activation and deactivation of the servo-motor 86. Thus, the servo-motor 86 can be programmed to operate for a set time period, then stop, to effect precision centering. This allows the present invention to center a golf ball precursor product 58 within a cavity without the need for a stop or other accessories for limiting the downward progression of the golf ball precursor products. In one preferred embodiment, the servo-motor 86 controls a threaded screw 90 which is threadingly connected to the locating plate 82.

Each of the vacuum cups 84 are themselves movable between an insertion position and a retraction position. The movement of the vacuum cups is preferably actuated by pneumatic cylinders. However, a series of servo-motors may also be used to actuated the movement of the vacuum cups 84. Each of the vacuum cups 84 has a recess, not shown, that is in flow communication with a vacuum line, not shown, for exerting a vacuum on the golf ball precursor product 58 for suctioning thereof into the recess, and for retaining the golf ball precursor product 58 therein during the insertion step.

A spacer plate 96 is mounted on the frame 62 along the longitudinal pathway 74. The spacer plate 96 has a central aperture 98 therein for allowing the vacuum cups 84, with golf ball precursor products attached thereto, to engage the cavities with the thermoset material therein.

A lifter mechanism 110 is disposed below the line of conveyance 24. The lifter mechanism 110 has a pneumatic cylinder 112 for lifting a lifter plate 114 along the longitudinal pathway 74. A first mold half 122a is disposed on the lifter plate 114 during its vertical movement. A set of hooks, or other conventional locking means, engage the first mold half 122a to restrain its lateral movement during vertical movement along the longitudinal pathway 74.

The first mold half 122a, with the plurality of mold cavities 132 that each have previously received a predetermined quantity of the thermoset flowable material from a dispenser at the dispensing station 26, is transferred from the dispensing station 26 to the insertion station 28 by the conveyor 24. A retractable limiting member is preferably utilized to limit movement of the fist mold half at the insertion station 28. The lifter mechanism 74 then lifts the first mold half 122a to an insertion position at the spacer plate 92. The lifter is set to elevate the first mold half 122a to a position for receiving each of the golf ball precursor products 58 into corresponding cavities 132. A more detailed explanation of the insertion mechanism is set forth in U.S. Pat. No. 6,387,316, filed on Feb. 1, 2000, and entitled A Cast Molding Insertion Apparatus, which is hereby incorporated by reference in its entirety.

From the insertion station 28, the first mold half is conveyed to the mold assembly station 30. At the mold assembly station 30, the first mold half, with the golf ball precursor products 58 therein, is positioned about an inverting mechanism 45. The inverting mechanism 45 has a pair of grips 46 that grasp the sides of the first mold assembly 122a and invert and move it above the second mold half 122b. The first mold half 122a is lowered for engagement with the second mold half 122b. Preferably only 30 to 60 seconds elapse from the departure from the dispensing station 26 to the assembly of the mold halves 122a–b, and most preferably only 42 seconds. A pair of studs are then rotated to threadingly engage a pair of bolts for locking of the mold assembly 120, and for exerting a predetermined pressure on each of the mold cavities 132. The mold assembly 120 is then conveyed to an oven for heating under pressure, and then to a cooling oven.

As shown in FIGS. 9–13, a mold assembly for casting a layer of a thermoset material on a golf ball precursor product is generally designated 120, and is composed of the first mold half 122a and a second mold half 122b. In a preferred embodiment, the first mold half 122a is the top mold half and the second mold half 122b is the bottom mold half. A preferred mold assembly 120 is described in co-pending U.S. patent application Ser. No. 09/495,583 filed on Feb. 1, 2000, entitled Golf Ball Casting Mold Assembly, which is hereby incorporated in its entirety by reference. However, those skilled in the pertinent art will recognize that other mold assemblies may be utilized with the present invention without departing from the scope and spirit of the present invention.

Each mold half 122a–b is generally composed of a carrier base 124, a carrier plate 126 and a retainer plate 128. Each mold half 122a–b also has a plurality of mold inserts 130 positioned within mold insert apertures 131 of the retainer plate 128 and mold insert apertures 133 of the carrier plate 126. The carrier plate 126 is sandwiched between the carrier base 124 and the retainer plate 128. The carrier plate 126 carries the mold inserts 130 during the casting process. The retainer plate 128 is designed to lock each of the mold inserts 130 in the carrier plate 126. The carrier base 124 is the mold assembly's 120 contact surface during conveyance through a casting system.

FIGS. 14–17 illustrate preferred mold inserts 130 that are used with the mold assembly 120. Each mold insert 130 has a hemispherical cavity 132 within a body 134. Around a center height of the body 134 is an annular flange 136 that has an alignment flat 138 along a portion thereof. The flange 136 is used for mounting each mold insert 130 on the carrier plate 126.

Figure 10:
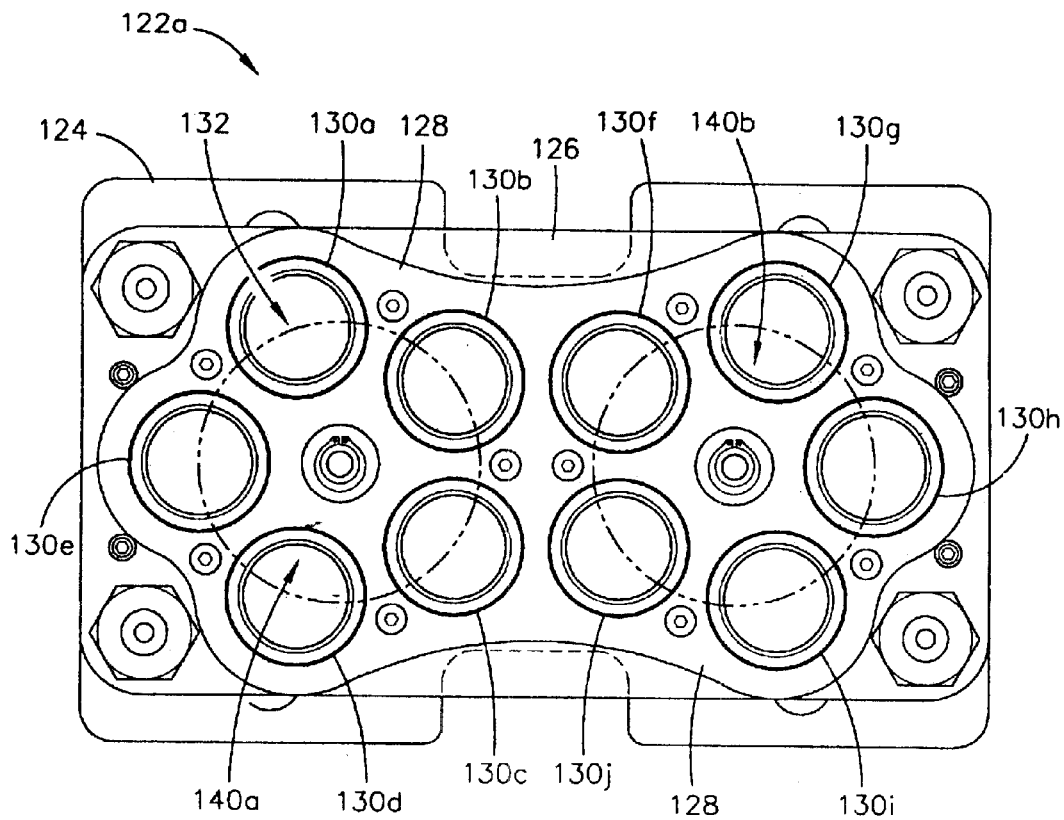
FIG. 10 is a top plan view of top mold half of the mold assembly of FIG. 9.
Figure 11:
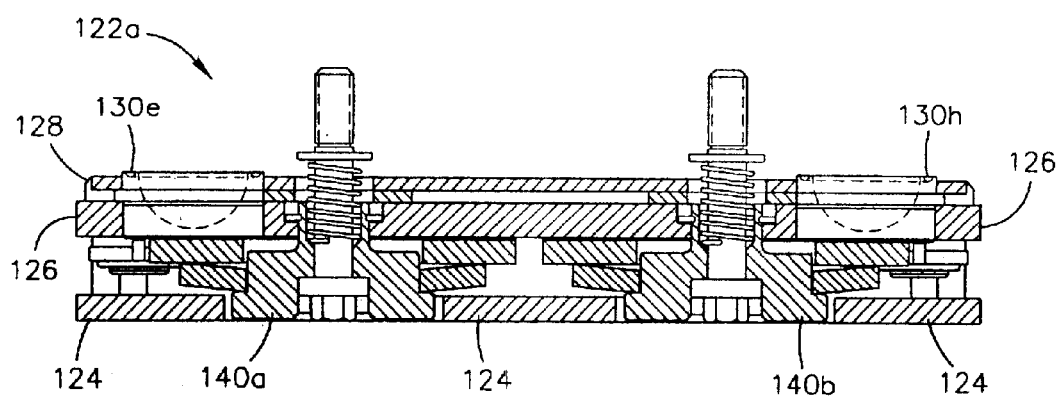
FIG. 11 is a cross-sectional view of the top mold half of FIG. 10.
Figure 12:
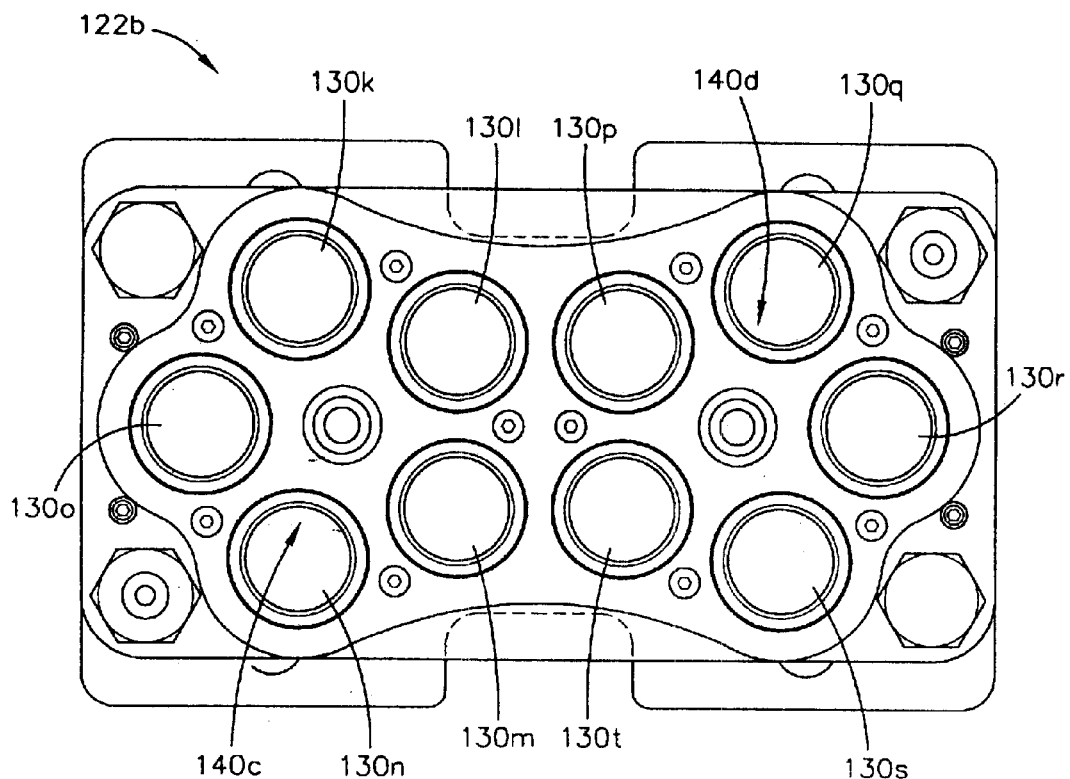
FIG. 12 is a top plan view of a bottom mold half of the mold assembly of FIG. 9.
Figure 13:
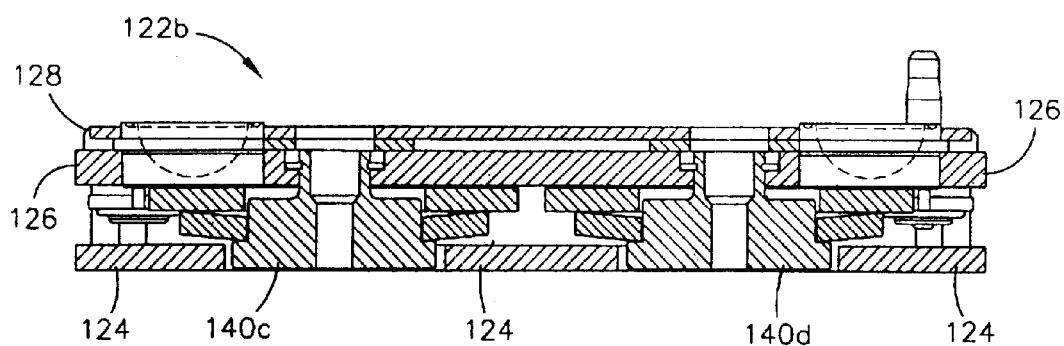
FIG. 13 is a cross-sectional view of the bottom mold half of FIG. 12.
Figure 14:
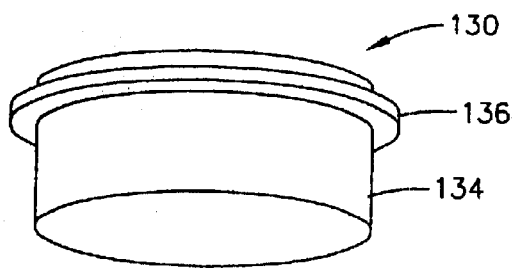
FIG. 14 is a plan view of a mold insert placed within a mold half of the mold assembly of FIG. 9.
Figure 15:
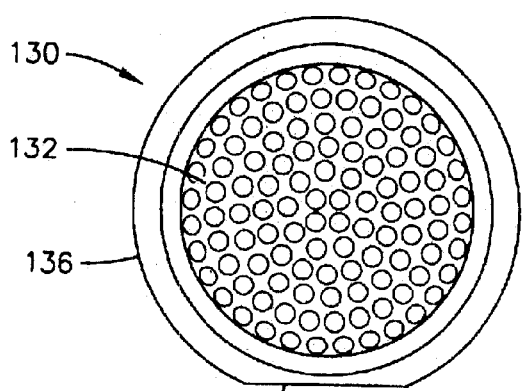
FIG. 15 is a top plan view of the mold insert of FIG. 14 illustrating the inverse dimple pattern for creating a thermoset cover with a dimple pattern thereon.
Figure 16:
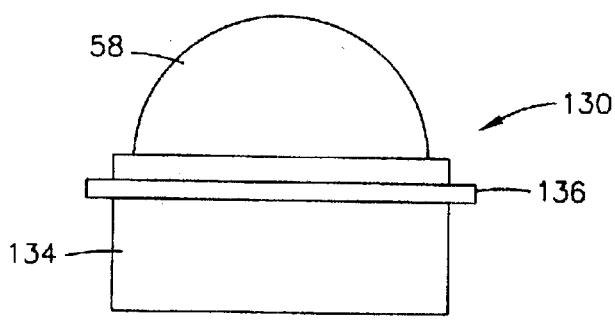
FIG. 16 is a side view of the mold insert of FIG. 14 with a golf ball precursor product therein.
Figure 17:
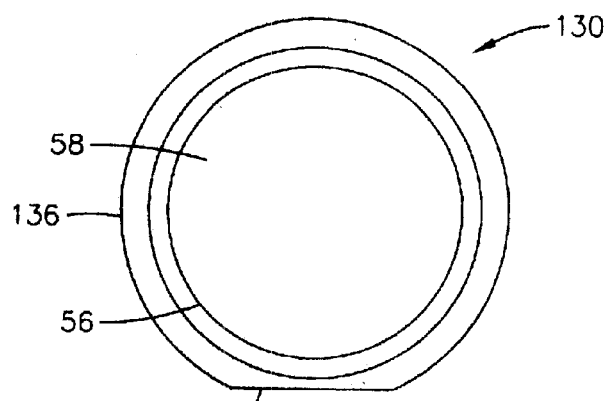
FIG. 17 is a top plan view of FIG. 16.

The hemispherical cavity 132 preferably has an inverse dimple pattern thereon if a cover 56 is formed in the mold insert 130. However, the hemispherical cavity 132 will have a smooth surface if a boundary layer 54 is formed in the mold insert 130. The number of mold inserts 130 used for each mold half 122a–b may preferably range from eight to twelve, and is most preferably ten. In the preferred embodiment, as shown in FIGS. 10 and 12, five mold inserts 130a–e are positioned about hub mechanism 140a, five mold inserts 130f–j are positioned about hub mechanism 140b, five mold inserts 130k–o are positioned about hub mechanism 140c, and five mold inserts 130p–t are positioned about hub mechanism 140d. Those skilled in the art will recognize that more or less than five inserts may be positioned about each hub mechanism 140a–d without departing from the scope and spirit of the present invention.

Figure 18:
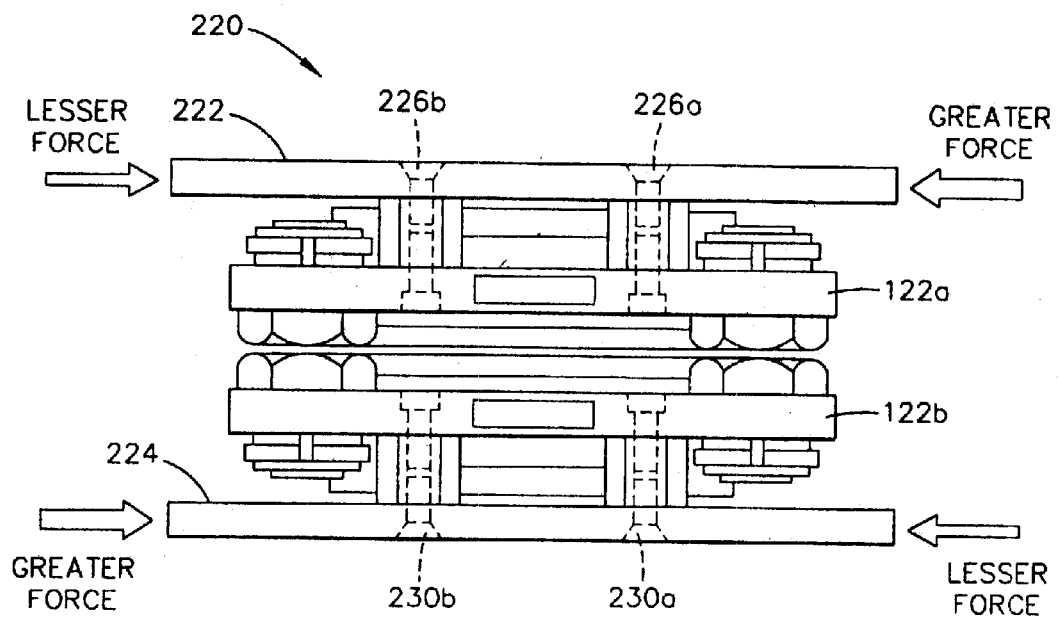
FIG. 18 is an isolated view of the mold assembly at the de-molding station prior to de-molding.
Figure 19:
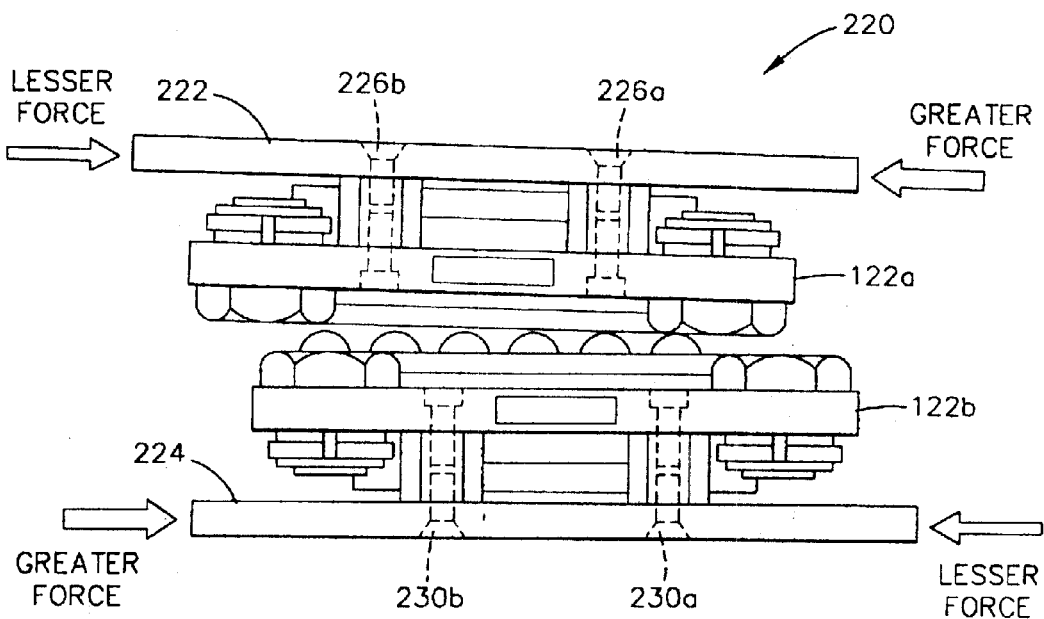
FIG. 19 is an isolated view of the mold assembly at the de-molding station during de-molding.

FIGS. 18 and 19 illustrate the mold disassembly mechanism 220 of the disassembly station 214. The mechanism 220 has a top plate 222 and a bottom plate 224. The top plate has at least two locking hooks 226a–b that engage the first mold half 22a. The top plate 222 also has a pair of bolt disassemblers 228 for reversing the threaded engagement of bolts to the nuts. The bottom plate 224 has at least two locking hooks 230a–b for engaging the second mold half 22b during de-molding. The bottom plate 224 has a pneumatic cylinder 232 for vertical movement. Both the top plate 222 and the bottom plate 224 have pneumatic cylinders 234 for lateral movement. In a preferred embodiment, the bottom plate 224 will have the pneumatic cylinders 234 on one side, and the top plate 222 will have the pneumatic cylinders on the opposite side to create a shearing effect. An alternative embodiment has pneumatic cylinders 234 on both sides of the bottom plate 224 and both sides of the top plate 222 with one side having a greater lateral force than the other side for each of the plates 222 and 224.

During the disassembly operation, the mold assembly 20 enters the disassembly mechanism 220 where the hooks 230a–b of the bottom plate engage and lock with the second mold half 22b. The bottom plate 224 with the mold assembly 20 thereon, is then lifted for engagement with the top plate 222. The hooks 226a–b of the top plate 222 engage and lock with the first mold half 22a. The bolt disassemblers 228 engage and reverse the threaded engagement of bolts 86a–b to the nuts 88a–b. The pneumatic cylinders 234 then exert a lateral force on the top plate 222 in a first direction and a lateral force on the bottom plate 224 in a second direction opposite the first direction allowing for the shearing of the mold assembly 20. A lateral force in a third direction, opposite the first direction, may also be exerted on the top plate 222, however, the lateral force in the third direction will be less than the lateral force in the first direction. Similarly, a lateral force in a fourth don, opposite the second direction, may also be exerted on the bottom plate 224, however, the lateral force in the fourth direction will be less than the lateral force in the second direction. The shearing effect allows for the golf balls to be pinched or rolled out of the cavities 132 of the first mold half 122a while remaining in the cavities 132 of the second mold half 122b. The first mold half 122a is also angled upward due to the tapered pin which may be retractable between a molding and de-molding position, or may be fixed with double tapers. The angle of the tapered pin angles the cavities 132 of the first mold half 122a relative to the cavities 132 of the second mold half 122b allowing for the rolling of the golf balls from the cavities 132 of the first mold half 122a. A more detailed explanation of the de-molding mechanism is set forth in U.S. Pat. No. 6,328,921, filed on Feb. 1, 2000, and entitled A De-Molding Apparatus For A Golf Ball which is hereby incorporated by reference in its entirety.

After the de-molding of the golf balls from the first mold half 122b, the bottom plate 224 is lowered with the second half 122b thereon which is then conveyed to the ball removal station 216. The first mold half 122a remains engaged with the top plate 222 until a grip mechanism, not shown, engages the first mold half 122b and removes it to a second conveyance line 25. The de-molding system of the present invention allows for the golf balls to be removed while they are still relatively hot, allowing for reduced production time.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A system for casting a thermoset layer on a golf ball precursor product, the system comprising:

a mold assembly comprising first and second mold halves, each of the mold halves having a plurality of hemispherical cavities herein;

a dispensing mechanism having a stationary dispenser and an X-Y gantry, the stationary dispenser dispensing a flowable material into each of the plurality of cavities while the X-Y gantry moves each of the mold halves in a figure eight pattern below the stationary dispenser, the stationary dispenser first dispensing a flowable material into each of the plurality of cavities of the first mold half prior to dispensing flowable material into any of the plurality of cavities of the second mold half;

an insertion mechanism having a plurality of vacuum cups for suctioning a plurality of golf ball precursor products from a platen and moving downward along a longitudinal pathway, and a lifter for lifting the first mold half upward along the longitudinal pathway toward the vacuum cups;

a minor conveyor for conveying the first mold half from the dispensing mechanism to the insertion mechanism;

a mold assembly mechanism for inverting the first mold half and mating it with the second mold half;

a main conveyor for transferring the mold assembly along the system;

a heating oven for curing a thermoset layer on each of the golf ball precursor products;

a cooling oven disposed subsequent to the heating oven, the cooling oven partially cooling the mold assembly; and a de-molding mechanism for separating the first mold half from the second mold half, and removing each of the thermoset layered golf balls from the first mold half, the de-molding mechanism comprising a mold assembly separation mechanism capable of exerting a first lateral force on the first mold half in a first direction, and a second lateral force on the second mold half in a second direction opposite the first direction, wherein the first mold half slides over a tapered pin of the second mold half when the mold assembly separation mechanism exerts the first and second lateral forces against the first and second mold halves respectively.

2. The system according to claim 1 wherein the insertion mechanism further comprises:

a source of golf ball precursor products;

a locating plate for mounting of the plurality of vacuum cups, the locating plate movable along the longitudinal pathway from at least a platen position, an upper limit position and an insertion position;

a spacer plate disposed along the longitudinal pathway and having an aperture for placement of each of the vacuuming cups, with a golf ball precursor product, therethrough.

3. The system according to claim 2 further comprising means for moving each of plurality of vacuum cups from an insertion position to a retraction position.

4. The system according to claim 1 wherein the plurality of mold cavities is ten and the plurality of golf ball precursor products is ten.

5. The system according to claim 1 wherein the golf ball precursor product is a core with a boundary layer and the thermoset layer is a polyurethane cover.

6. The system according to claim 2 further comprising a servo-motor for controlling the vertical movement of the locating plate along the longitudinal pathway.

7. The system according to claim 1 wherein the mold assembly separation mechanism further comprises:

a first locking hook for engaging the first mold half;

a second locking hook for engaging the second mold half;

a first cylinder connected to the first locking hook for exerting the first lateral force against the first mold half;

a second cylinder connected to the second locking hook for exerting the second lateral force against the second mold half; and a third cylinder connected to the second locking hook for vertical movement thereof.

8. The system according to claim 1 wherein the flowable thermoset material is a thermoset polyurethane.

* * * * *